(12) United States Patent
Yagyu et al.

(10) Patent No.: US 7,990,863 B2
(45) Date of Patent: Aug. 2, 2011

(54) CHANNEL ALLOCATION FOR ACCESS POINT IN MESH NETWORK

(75) Inventors: Kengo Yagyu, Yokohama (JP); Shinji Takeda, Yokohama (JP); Koji Omae, Yokohama (JP); Hidenori Aoki, Yokohama (JP); Atsushi Fujiwara, Yokohama (JP); Yoichi Matsumoto, Minato-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 153 days.

(21) Appl. No.: 11/935,623

(22) Filed: Nov. 6, 2007

(65) Prior Publication Data

US 2008/0069059 A1  Mar. 20, 2008

Related U.S. Application Data

(62) Division of application No. 11/175,318, filed on Jul. 7, 2005, now Pat. No. 7,738,374.

(30) Foreign Application Priority Data

Jul. 7, 2004  (JP) .................................. 2004-201061
Apr. 20, 2005  (JP) .................................. 2005-122564

(51) Int. Cl.
  *G01R 31/08*  (2006.01)
(52) U.S. Cl. ........ 370/232; 370/239; 455/453; 455/450; 455/452.2; 455/454

(58) Field of Classification Search .................. 455/453, 455/450, 452.2, 454
See application file for complete search history.

(56) References Cited

U.S. PATENT DOCUMENTS

| 5,966,662 A * | 10/1999 | Murto ............................ 455/458 |
| 6,366,780 B1 * | 4/2002 | Obhan ............................ 455/453 |
| 2004/0218580 A1 * | 11/2004 | Bahl et al. ..................... 370/350 |
| 2005/0208949 A1 * | 9/2005 | Chiueh ....................... 455/452.2 |

FOREIGN PATENT DOCUMENTS

| JP | 2003-333053 | 11/2003 |
| JP | 2003-348005 | 12/2003 |
| WO | WO 03/084154 A1 | 10/2003 |
| WO | WO 03/084160 A1 | 10/2003 |

OTHER PUBLICATIONS

Jörg Habetha, et al., "Dynamic Clustering with Quality of Service Guarantees and Forwarder Selection in Wireless Ad Hoc Networks", Philips Research Laboratories, XP-002283922, Nov. 2000, pp. 1-5.

(Continued)

*Primary Examiner* — Kent Chang
*Assistant Examiner* — Dung Lam
(74) *Attorney, Agent, or Firm* — Oblon, Spivak, McClelland, Maier & Neustadt, L.L.P.

(57) ABSTRACT

A channel allocation method for dynamically allocating channels of a plurality of radio interfaces at each access point included in a mesh network is provided. The method includes the steps of (a) acquiring, at each access point, in-node information about the access point itself, and (b) grouping high-traffic access points in a cluster using a same channel set based on the acquired information.

3 Claims, 14 Drawing Sheets

OTHER PUBLICATIONS

Jung-Hee Ryu, et al., "New Clustering Schemes for Energy Conservation in Two-Tiered Mobile Ad-Hoc Networks", IEEE International Conference on Communications, vol. 1 of 10, XP-010553124, Jun. 11, 2001, pp. 862-866.

Chunhung Richard, et al, "Adaptive Clustering for Mobile Wireless Networks", IEEE Journal on Selected Areas in Communications, IEEE Inc., vol. 15, No. 7, XP-000721262, Sep. 1997, pp. 1265-1275.

Kohei Mizuno, et al., "An Evaluation of Self-organization Method for Multihop Wireless Networks", IEICE, Technical Report, vol. 102, No. 281, ISSN 0913-5685 RCS 2000-137, Aug. 2002, pp. 1-6.

Jing Zhu, et al., "Maximizing Aggregate Throughput in 802.11 Mesh Networks with Physical Carrier Sensing and Two-Radio Multi-Channel Clustering", in Proceedings of NSF-FPI Workshop on Pervasive Computing and networking, Apr. 29-30, 2004, pp. 1-12.

Office Action issued Nov. 9, 2010 in JP Application No. 2005-122564 (With English Translation).

Yoji Kishi, et al., "A Proposal of Multi-hop Mesh Network Architecture Featuring Adaptive Network Control for Broadband Fixed Wireless Access Systems", The Transactions of the Institute of Electronics, Information and Communication Engineers, B, vol. J85-B, No. 12, Dec. 2002, pp. 2025-2036 (With Partial English Translation).

Kohei Mizuno, et al., "A Multichannel Media Access Control Protocol for Multihop Wireless Networks with Guaranteed Functions", The Transactions of the Institute of Electronics, Information Communication Engineers, B, vol. J85-B, No. 12, Dec. 2002, pp. 2179-2188 (With English Translation).

* cited by examiner

FIG.5

$$TI_{AB}^{11a} = \{a \times (\text{Traffic Amount for AC0 between A and B})$$
$$+ b \times (\text{Traffic Amount for AC1 between A and B})$$
$$+ c \times (\text{Traffic Amount for AC2 between A and B})$$
$$+ d \times (\text{Traffic Amount for AC3 between A and B})\}$$
$$/ \text{Transmission Rate of Link A}-\text{B}$$

CHANNEL ALLOCATION FOR ACCESS POINT IN MESH NETWORK

CROSS-REFERENCE TO RELATED APPLICATIONS

This application is a divisional of co-pending U.S. patent application Ser. No. 11/175,318 filed Jul. 7, 2005, which claims the benefit from priority of Japanese Patent Applications No. JP 2005-122564, filed Apr. 20, 2005 and JP 2004-201061, filed Jul. 7, 2004, the entire contents of each of which are incorporated herein by reference.

FIELD OF THE INVENTION

The present invention generally relates to a channel allocation technique, and more particularly, to channel allocation for an access point in a mesh network (an adhoc network or a self-organizing network) structured by multiple access points with wireless communication abilities.

DESCRIPTION OF THE RELATED ART

A wide range of applications of mesh networking is being proposed. For example, an application to a home network in which consumer electronics, such as a television set or a DVD player, are provided with functions of access points is proposed. In such a network, audio and video data are transmitted from the DVD player to the television set, in response to a request from the television set, without using cable connections or other wired connections. To push such an application to practical use, the data transmission rate between access points has to be increased.

FIG. 1 is a schematic diagram of a conventional mesh network, in which the number of channels allocated is the same as that of the radio interfaces of the access point. Each of the access points AP1-AP4 has two radio interfaces, which radio interfaces are set to channels f1 and f2, respectively. The number of channels is not limited to this example, and channels to be allocated may be increased in accordance with the number of radio interfaces if many radio interfaces are used.

By allocating multiple channels to each access point, simultaneous communication with other access points using different channels is realized, and the transmission rate between access points is increased. In this example, since the number of radio interfaces is equal to that of the channels, it is unnecessary to allocate a different set of channels to each access point separately.

FIG. 2 is a schematic diagram of a conventional mesh network, in which the number of channels available in the network is more than that of the radio interfaces of each access point. By increasing the number of channels, the efficiency of the mesh network is temporarily improved. However, because all the channels cannot be used simultaneously at the radio interfaces of each access point, the access points are clustered. For example, in FIG. 2, access points AP1 and AP4 are grouped in a cluster that uses a channel set of channels f1 and f3, while access points AP3 and AP2 are grouped in a cluster that uses a channel set of channels f1 and f2. In this context, a cluster is a logical group of nodes that use the same channel set.

In this case, two channels can be used simultaneously between access points AP1 and AP4 grouped in the same cluster. Similarly, two channels are used simultaneously between access points AP3 and AP2 in the same cluster. Accordingly, high-rate transmission can be performed. For the data transmission between access points belonging to different clusters is used the common channel of frequency f1, and accordingly, the transmission rate is decreased.

FIG. 3 is an example of conventional access point clustering based on network topology, which method is designed so as to group those access points located close to each other together in the same cluster in the mesh network. Access points AP1-AP3 are grouped in the first cluster, access points AP4-AP7 are put in the second cluster, and access points AP8-AP10 are arranged in the third cluster. The criterion and the control sequence as to which range of access points are grouped in the same cluster are different among proposals. See, for example, (1) Mizuno, et al. "An Evaluation of Self-organization Method for Multihop Wireless Networks", IEICE, Technical Report, Vol. 102 No. 281 ISSN 0913-5685 RCS 2000-137 (2002-08); and (2) Jing Zhu, et al., "Maximizing Aggregate Throughput in 802.11 Mesh Networks with Physical Carrier Sensing and Two-Radio Multi-Channel Clustering", in Proceedings of NSF-FPI Workshop on Pervasive Computing and Networking, Apr. 29-30, 2004.

The above-described channel allocation (clustering) based on the physical position of the nodes is advantageous in that the control operation is easy.

In the conventional method, channel allocation to the access points in the mesh network is carried out based on the physical position of the nodes, and high-speed communication can be performed between access points in the same cluster because of the sufficient number of available channels. In contrast, communication between access points across clusters cannot be carried out at high rate because fewer channels are available for inter-cluster communication.

In a mesh network, communication conditions are unfixed, always changing depending on situations, and accordingly, a large amount of transmission may often occur across clusters. In such a case, the throughput falls down, and the network efficiency is degraded.

SUMMARY OF THE INVENTION

The present invention is conceived in view of the above-described problems in the prior art, and it is an object of the invention to provide a channel allocation technique that can increase the throughput in a mesh network and improve the network efficiency.

To achieve the object, in one aspect of the invention, a channel allocation method for dynamically allocating channels of a plurality of radio interfaces at each access point included in a mesh network is provided. The method includes the steps of (a) acquiring, at each access point, in-node information about the access point itself, and (b) grouping high-traffic access points in a cluster using a same channel set based on the acquired information.

In a preferred example, the in-node information includes all or a part of channel information representing a usage and quality of each channel; session information representing a session between access points; traffic information representing a transmission amount or channel congestion between the access point and a counterpart access point being in communication; and information about existence or a level of interference from another system.

In this case, the traffic information may include the number of packets transmitted and received, packet size, and a time rate of channel occupation estimated from a employed modulation scheme.

This method may further include the step of weighting the traffic information according to a QoS.

Alternatively, the method may further includes the steps of measuring an amount of packet received from other system or a channel usage ratio in a time by said other system during monitoring of the traffic information, and determining interference from other system.

Alternatively, the method may further include the step of exchanging statistical information among access points in the mesh network.

In this case, the statistical information is shared among all of the access points in the mesh network.

Alternatively, the statistical information is shared between nearby access points.

The statistical information includes channel information representing of a uage ratio in a time, and quality of each channel, session information representing a session between access points, and traffic information representing a traffic amount or degree of congestion between the access point and a counterpart access point being in communication.

In the method, the cluster has at least one common channel in the channel set.

Alternatively, the cluster has a common channel shared with another cluster, without having a common channel shared throughout the mesh network.

In another aspect of the invention, an access point is provided. The access point includes an in-node information acquiring unit configured to acquire information about the access point itself, a clustering determination unit configured to select a node to be clustered based on the in-node information, and a channel switching unit configured to change a channel of radio interface based on the determination result made by the clustering determination unit.

In a preferred example, the access point may further include a statistical information exchanging unit configured to exchange statistical information among other nodes, wherein the clustering determination unit selects the node to be clustered based on the in-node information and the exchanged statistical information.

In another example, the access point may further include a control line for supplying a channel change message to a routing protocol, wherein the routing protocol temporarily uses an radio interface different from a target radio interface to be subjected to channel change for current communication, based on the channel change message.

Alternatively, the routing protocol temporarily suspends transmission and relay of a routing packet at a target radio interface to be subjected to channel change for a prescribed time period, based on the channel change message.

In the invention, dynamic and logical clustering is performed so as to put high-traffic nodes in the same cluster, unlike the conventional clustering performed based on the topology information representing the relation of the physical locations of the access points. Consequently, the throughput of the mesh network can be increased, and the network efficiency is improved.

BRIEF DESCRIPTION OF THE DRAWINGS

Other objects, features, and advantages of the invention becomes more apparent from the following detailed description when read in conjunction with the accompanying drawings, in which

FIG. 5 is an example of calculation of a traffic information value;

DETAILED DESCRIPTION OF THE PREFERRED EMBODIMENTS

The preferred embodiment of the present invention is described below in conjunction with the attached drawings. In the embodiment, an application of the invention to an IEEE 802.11 wireless LAN access point is used as an example.

Figure 1:
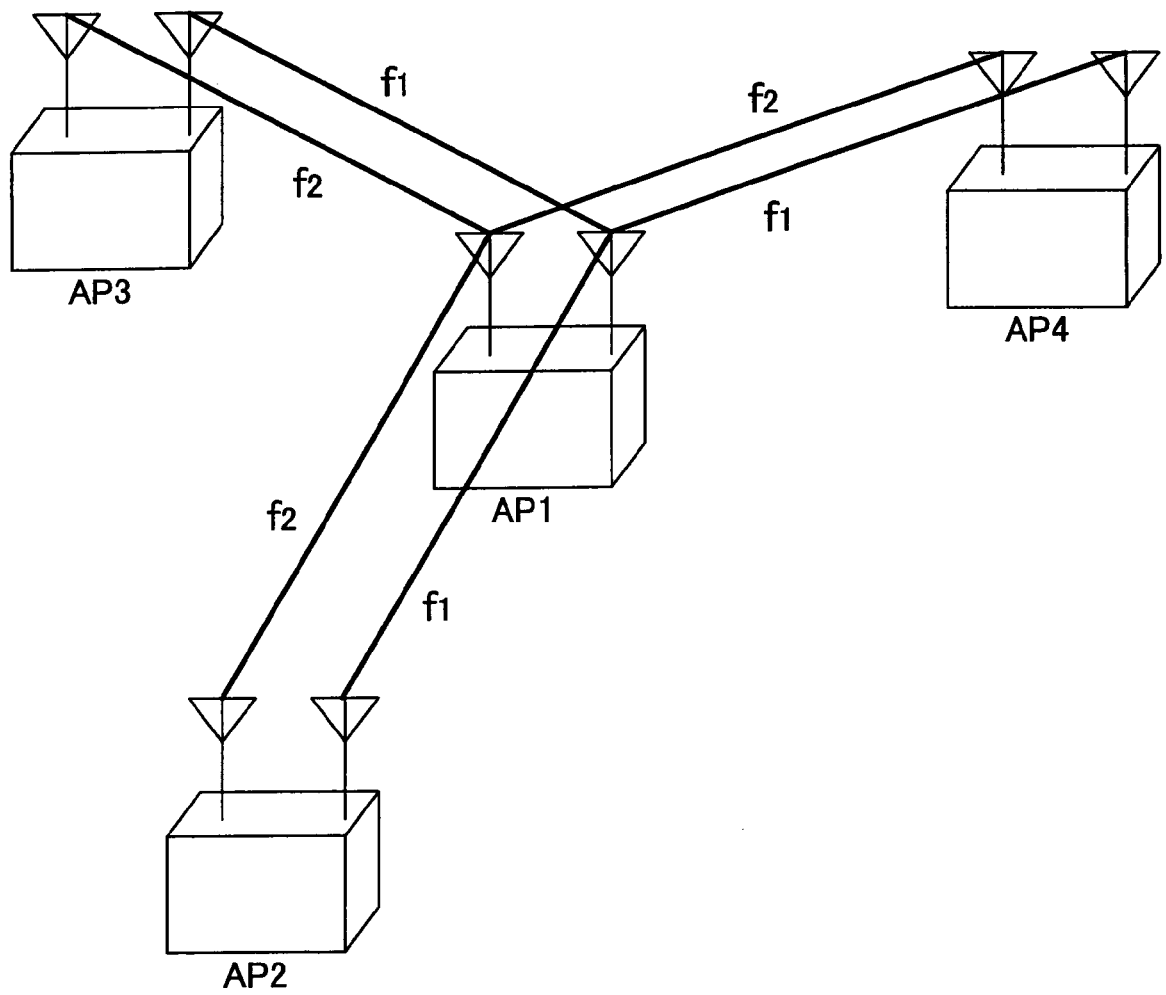
FIG. 1 is a schematic diagram illustrating a conventional mesh network in which the number of channels allocated is the same as the number of radio interfaces.
Figure 2:
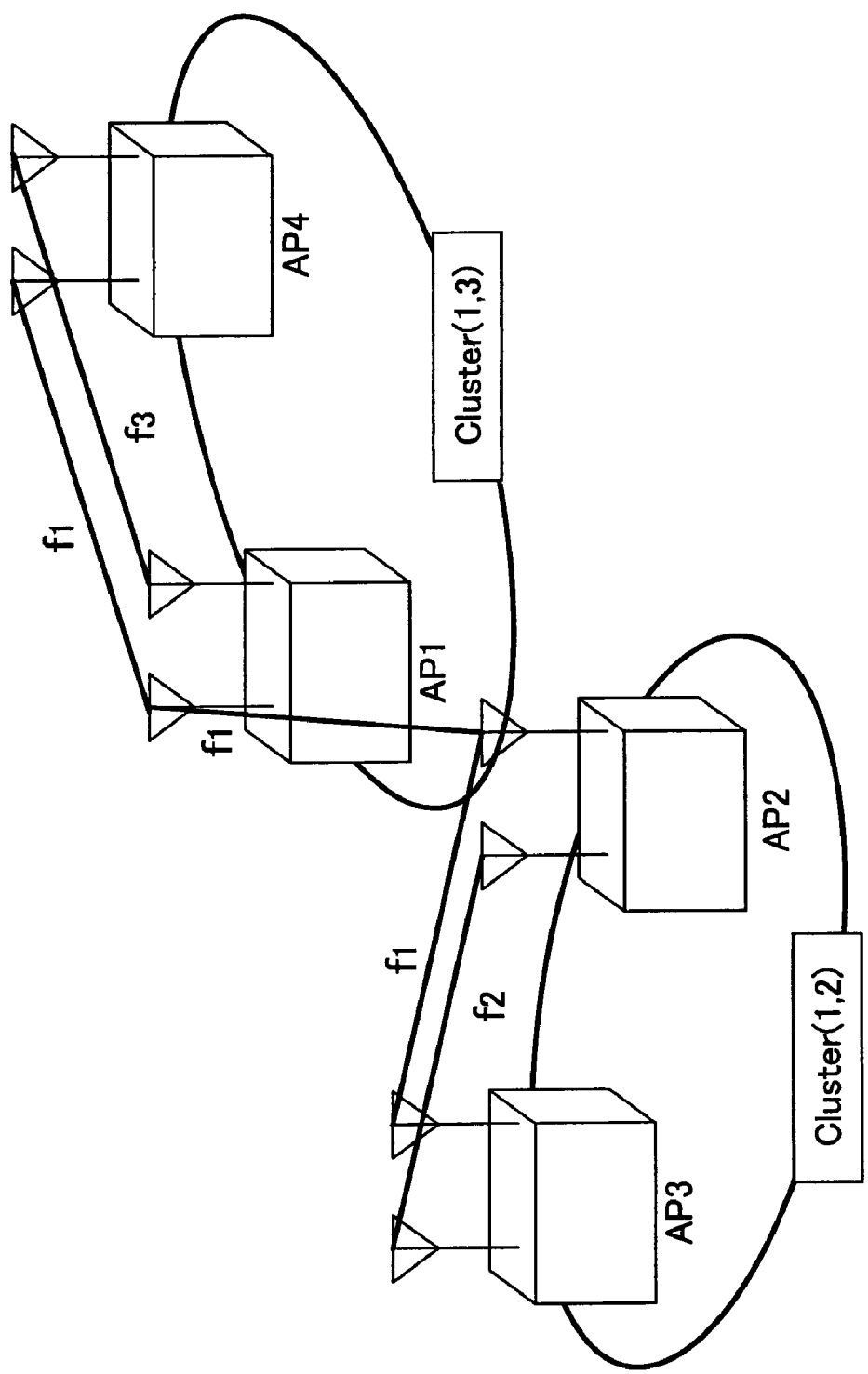
FIG. 2 is a schematic diagram illustrating a conventional mesh network in which the number of channels allocated is more than that of radio interfaces.
Figure 3:
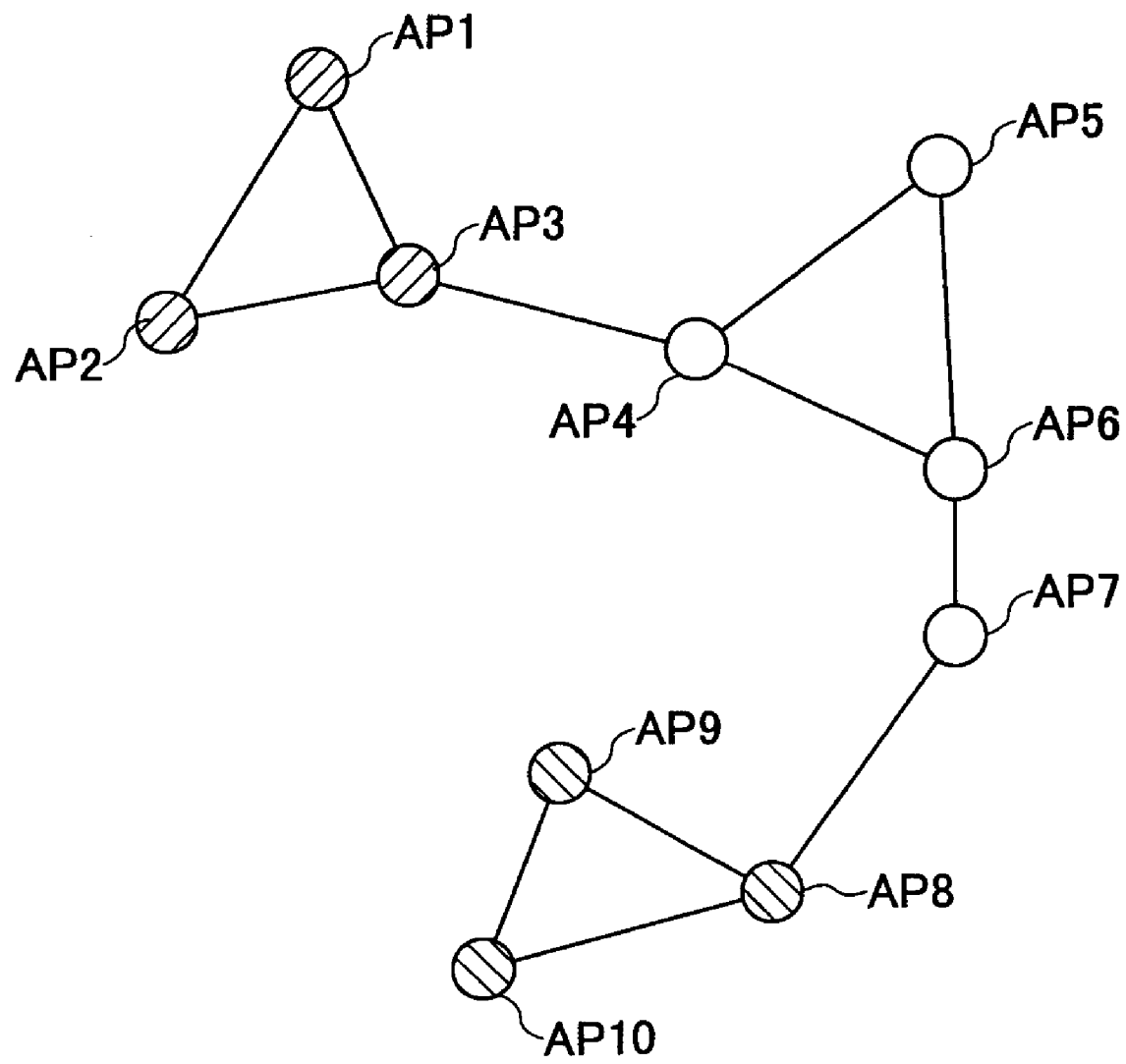
FIG. 3 is an example of conventional clustering based on the physical position of the nodes.
Figure 4:
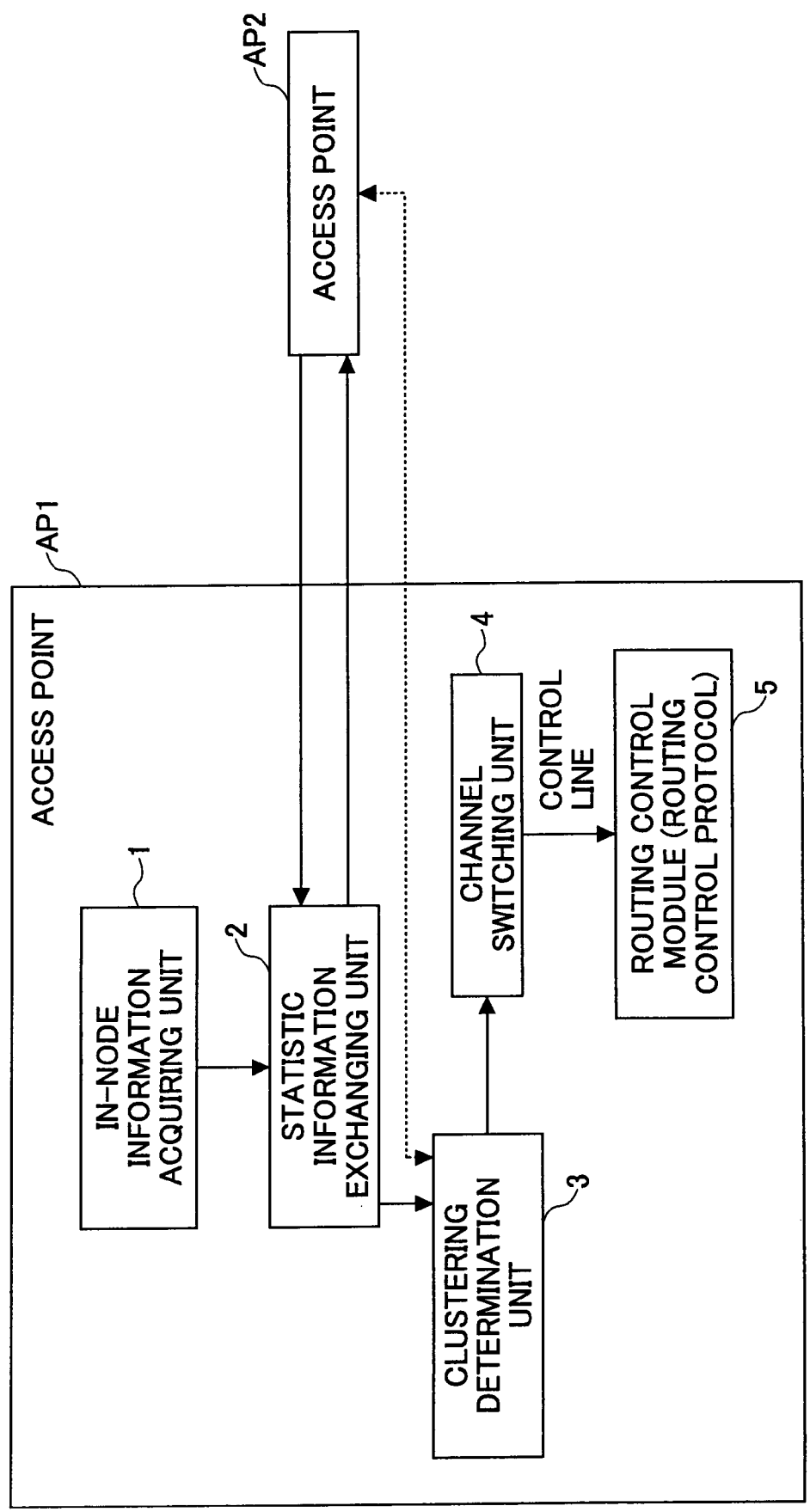
FIG. 4 is a schematic block diagram of an access point to which the channel allocation technique of the present invention is applied.

FIG. 4 is a schematic block diagram of an access point to which a channel allocation technique of the present invention is applied. This block diagram shows the clustering-related functional structure only, and other functions of the access point are omitted.

In FIG. 4, access point AP1 has an in-node information acquiring unit 1 that acquires the node information of the access point AP1 itself; a static information exchanging unit that exchange static information with other access points (e.g., AP2); a clustering determination unit 3 that determines a node (an access point) to be clustered based on the in-node information and the exchanged statistical information, and requests for clustering to said other node to obtain approval as necessary; and a channel switching unit 4 that changes the channel allocated to the radio interface based on the determination result made by the clustering determination unit 3. The channel switching unit 4 has a control line extending to a routing module 5 that performs routing when relaying received packets to other access points, through which line a channel indication signal is supplied to the routing module 5. If clustering is performed without exchanging the static information with other access points (AP2, for example), the static information exchanging unit 2 may be omitted.

Examples of the in-node information acquired by the in-node information acquiring unit 1 are listed below.

Channel Information: Information representing the usage and the quality of each channel. To be more precise, the number of beacons and the average power level transmitted from the access point using the channel, the number of data frames and the average power level of the data frame transmitted from the access point or a terminal device (station) belonging to the access point using the channel, and interference and noise level caused by channel occupation by other systems or white noise are included in the channel information.

Session Information: Information representing a session between the focused access point and the counterpart access point being in communication. To be more precise, the counterpart node ID (IP address or MAC address), the radio modulation scheme and the transmission rate (bit rate) of the current session, and the channel information used for the session are included.

Traffic Information: Information representing the transmission amount or the channel congestion level between the focused access point and the counterpart node (access points). To be more precise, the number of data frames transmitted and received at the access points and the relating stations during the communication, the frame size, the modulation scheme for transmitting the frames, the channel occupation time required for the frame transmission, and the transmission rate per unit time are included.

It should be noted that priority ranked node or traffic information may be received from an upper-layer if occurrence of heavy traffic is known in advance, or if high-quality transmission at high QoS (Quality of Service) is required. Such priority ranked information may also be used for the clustering node determination.

When high-quality transmission is required, necessary QoS may be realized by applying the IEEE 802.11e standard or the IETF DiffServe standard or other QoS technology. In this case, since each frame has a field in which the QoS value is written, the QoS can be determined frame by frame. For the data frame with a high QoS value, the frame size may be estimated larger than the actual size so as to provide the appearance of high traffic in order to allow a channel to be allocated preferentially. For example, for the data frame with a high QoS value, the data frame size may be counted three times as large as the actual size. With this arrangement, when high-quality communication, such as video conference data transmission or VoIP (Voice over Internet Protocol) calls, exists, a channel is allocated preferentially to that data transmission, and consequently, high-quality communication is achieved. When high QoS is not required, channel allocation is carried out based on the traffic level of ordinary communication. Thus, it is unnecessary to allocate channels to high QoS routes with manual setting in advance, but flexible channel allocation can be realized taking into account the currently required QoS.

FIG. 5 illustrates an example of calculation of a traffic information value corresponding to the IEEE 802.11e QoS. The left-hand side of equation shown in FIG. 5 represents the link traffic information TI between access points A and B based on the IEEE 802.11a radio interface. In the right-hand side of equation, the traffic amount of the access categories AC0, AC1, AC2, and AC3 corresponding to voice, video, and other data types are multiplied by weighting factors a, b, c, and d, respectively. The weighted traffic amounts are added up, and divided by the transmission rate between A and B. The coefficients a, b, c, and d are set to, for example, a=10, b=5, c=1, and d=0.5.

Concerning the traffic information to be measured, the IEEE 802.11 system employs adaptive modulation for adaptively changing the modulation scheme depending on the channel propagation conditions. When the channel quality is good, a modulation scheme capable of high-speed transmission is used, and when the channel propagation condition is degraded, another modulation scheme with high error tolerance, but with low transmission rate, is employed. Thus, adaptive communication corresponding to the environment is achieved.

Now, it is assumed that the same amount of data are transmitted on a link with a satisfactory channel condition capable of high-rate transmission and a link with a degraded channel condition and a lowered transmission rate. Focusing only on the transmitted and received data amount, the traffic amounts flowing on these two links are the same. However, in the actual radio conditions, the loads on the wireless channels imposed by these links are different. In the channel with the degraded condition forced to lower the transmission rate, more wireless channel resources are consumed for the data transmission.

In the actual transmission, communication is carried out on multiple links in the network. In view of the above-described point, it becomes necessary to measure not only the transmitted/received data amount, but also the time rate of actual wireless channel occupancy as the traffic information, in order to realize more efficient wireless channel allocation.

To measure the time rate of actual wireless channel usage, there are two methods.

One method is to directly measure the transmission and receiving time of the node by itself, and to calculate to what extent the wireless channel is occupied per unit time based on the measured transmission/receiving time.

The other method is to calculate the channel occupation time rate based on the data size and the number of packets actually transmitted and received, as well as on the bit rate used for the transmission.

By dividing the total amount of transmitted and received information by the employed bit rate, wireless channel consuming time required for that amount of data transmission can be calculated. The total amount of transmitted and received data is calculated from the number of packets and the packet size. There are two methods for calculating the total amount of the transmitted/received data, namely, a method for calculating transmission and receiving time for each packet based on the byte value and the bit rate and summing them up, and a method for calculating the data amount at constant intervals based on the average packet size, the average number of transmission packets, and the employed bit rate. The former method is capable of calculating small changes, and the latter method has a feature that the processing workload is low because of discontinuous calculation at constant intervals.

Simultaneously with the measurement of the traffic information, it is also possible to identify a packet from another system based on the source address of the received packet, the SSID (Service Set Identifier) field in the frame, or the mesh network ID information. In addition, by monitoring the channel occupation time of other systems, the radio band occupation ratio of other systems can be known. Using this information, channel switching may be carried out to avoid interference from other systems when the interference becomes greater. By including the interference information in the traffic information at high-interference periods, occurrence of interference can be reported to other nodes to urge the nodes to change channels. This arrangement is advantageous in that the interference information is shared in a mesh network in which propagation conditions and wireless conditions always vary.

The static information exchanged among the access points by means of the static information exchanging unit 2 in FIG. 4 includes statistically processed information about the past record and the in-node information acquired in each node (access point), such as average moving speed and digitally filtered information, as well as information that allows estimation of overall network traffic and distribution of channel congestion, which information cannot be obtained by a node itself, but is obtained from other nodes through information exchange.

There are mainly three types of statistical information exchange among nodes prior to the clustering process, namely, (1) exchanging statistical information between all the nodes,
(2) exchanging statistical information only between neighbor nodes, and
(3) not performing statistical information exchange (determining as to clustering only with in-node information).

Figure 6:
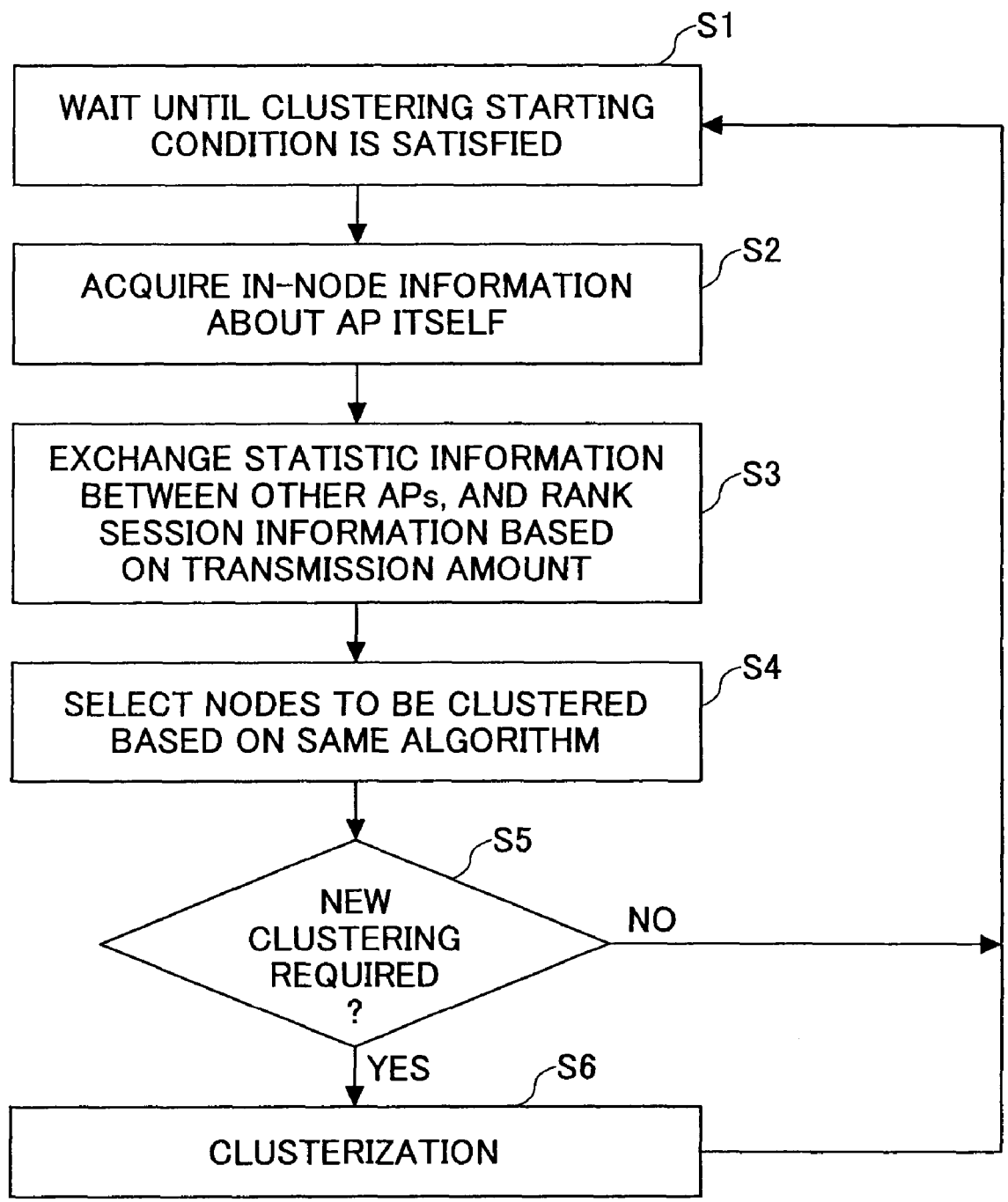
FIG. 6 is a flowchart showing an example of the clustering operation carried out at an access point.

FIG. 6 is a flowchart of the clustering operation performed at an access point, which flowchart corresponds to types (1) and (2) for exchanging statistical information between all or neighbor nodes.

In FIG. 6, the access point waits until the clustering starting condition is satisfied (S1). An example of satisfaction of the clustering starting condition is, (e.g. 1) elapse of a prescribed time period when the clustering operation is performed at constant intervals, (e.g. 2) receipt of an instruction from an upper layer, such as a routing layer, when the clustering operation is performed according to the network topology or the route change. Alternatively, if the clustering operation is started when the traffic amount is changed due to termination or start of communication, the condition is satisfied when the statistical information value or the amount of change exceeds a prescribed threshold at the time of receiving or measuring the statistical information to be exchanged. If two or more nodes start the clustering operation simultaneously, the same channel may be selected by these nodes. Accordingly, in this case, each node starts the clustering operation after a random time has passed since the clustering start condition has been satisfied.

When the clustering operation is started upon satisfaction of the condition, in-node information acquiring unit 1 (FIG. 4) acquires information generated or accumulated in the access point itself (S2).

Then, the statistical information exchanging unit 2 (FIG. 4) exchange statistical information between other access points, and ranks the counterpart node information based on the traffic load (S3).

Then, the clustering determination unit 3 (FIG. 4) selects nodes to be grouped in the same cluster, based on the acquired in-node information and the statistical information obtained from other nodes through information sharing (exchange) (S4). The clustering or channel allocation process aims to increase the candidates of routing paths; scatter traffic load on congested paths in order to increase the throughput; allocate the same channel as that of a heavy traffic node in order to increase the throughput; avoid occurrence of interference or collision and fall of throughput due to a layout in which a particular node serves as a hidden node or an exposed node; and prevent the throughput from falling due to collision or transmission queue by using a channel different from the channel used on a link between heavy traffic nodes.

Then, it is determined whether new clustering is required (S5). If no clustering is required (the current state is maintained without change), the process returns to step S1 to wait until the clustering start condition is satisfied.

If new clustering is required, the channel of the radio interface is changed by the channel switching unit 4 (FIG. 4) to carry out clustering (S6). In this step, an appropriate channel is selected so as not to overlap with nearby clusters to avoid interference of radio waves, and to be consistent with the channel quality. It is provided that the same channel set is used in a cluster; however, all the nodes in the cluster do not necessarily have to use the same channels. For example, under the situation where two radio interfaces are used, a channel set of three or more channels may be used. In this case, an actually allocated two channels are selected from the channel set for each node. The same applies even if the number of radio interfaces varies among the nodes.

After the channel change, the process returns to step S1 to wait until the clustering starting condition is satisfied again.

It should be noted that channel change may be performed appropriately even after the clustering process according to the channel quality or other factors, as well as in the clustering process.

Figure 7:
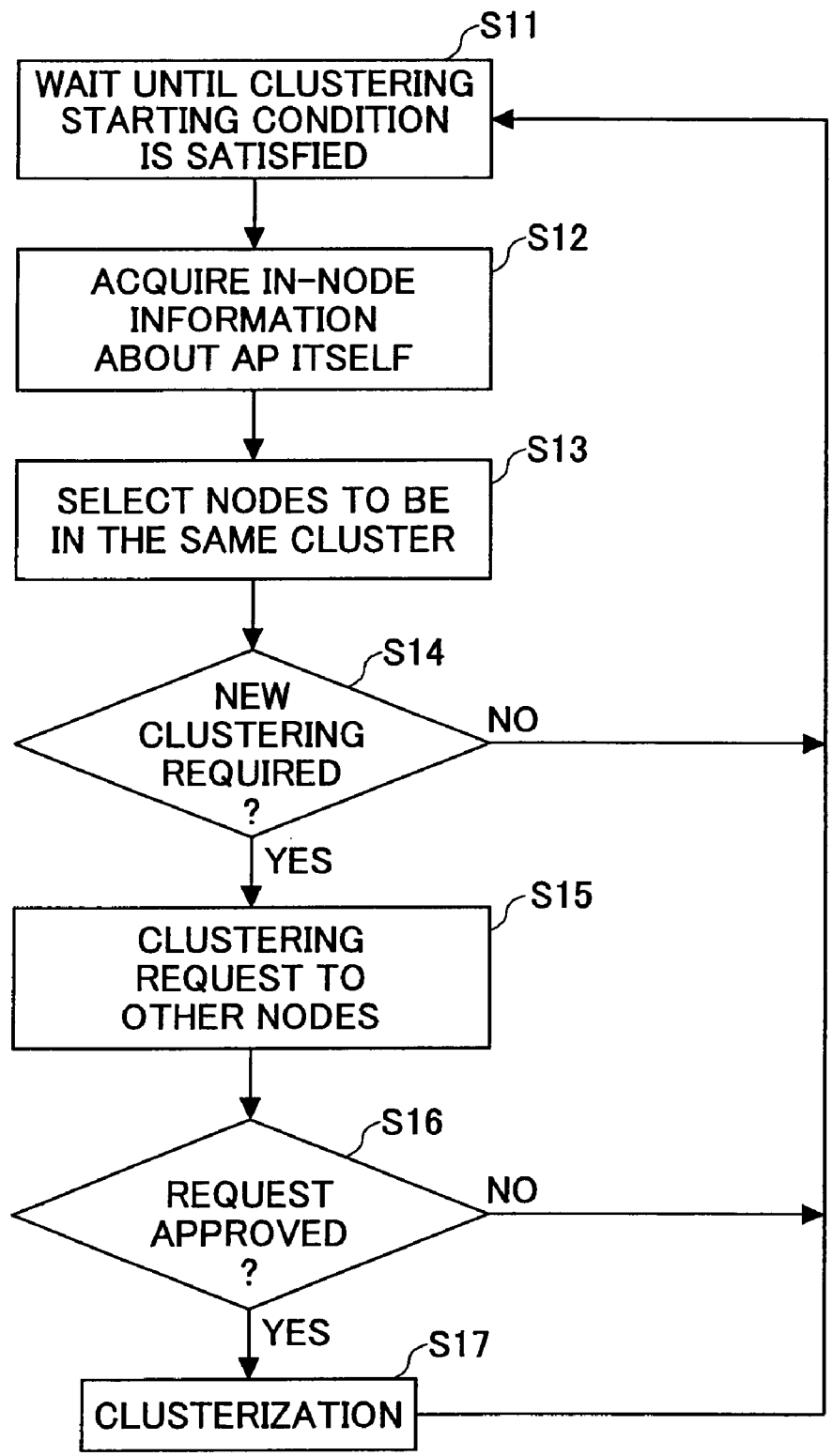
FIG. 7 is a flowchart showing another example of the clustering operation at the access point.

FIG. 7 is a flowchart of another example of the clustering operations carried out by an access point. In this example, determination as to clustering is made based only on the in-node information, without exchanging statistical information among nodes.

In FIG. 7, the access point waits until the clustering starting condition is satisfied (S11). An example of satisfaction of the clustering starting condition is, (e.g. 1) elapse of a prescribed time period when the clustering operation is performed at constant intervals, (e.g. 2) receipt of an instruction from an upper layer, such as a routing layer, when the clustering operation is performed according to the network topology or the route change. Alternatively, if the clustering operation is started when the traffic amount is changed due to termination or start of communication, the condition is satisfied when the statistical information value or the amount of change exceeds a prescribed threshold at the time of receiving or measuring the statistical information. If two or more nodes start the clustering operation simultaneously, the same channel may be selected by these nodes. Accordingly, in this case, each node starts the clustering operation after a random time has passed since the clustering start condition has been satisfied.

When the clustering operation is started upon satisfaction of the condition, in-node information acquiring unit 1 (FIG. 4) acquires information generated or accumulated in the access point itself (S12).

Then, the clustering determination unit 3 (FIG. 4) selects nodes that the access point wants to put together in the same cluster, based on the acquired in-node information (S13). In this step, the clustering or channel allocation process aims to increase the candidates of routing paths; scatter traffic load on congested paths in order to increase the throughput; allocate the same channel as that of a heavy traffic node in order to increase the throughput; avoid occurrence of interference or collision and fall of throughput due to a layout in which a particular node serves as a hidden node or an exposed node; and prevent the throughput from falling due to collision or transmission queue by using a channel different from the channel used on a link between heavy traffic nodes.

Then, it is determined whether new clustering is required (S14). If no clustering is required (the current state is maintained without change), the process returns to step S11 to wait until the clustering start condition is satisfied.

If new clustering is required, the access point transmits a request for clustering to other nodes selected in step S13 (S15).

If the clustering request is not approved by other nodes (NO in S16), the process returns to step S11 to wait until the clustering starting condition is satisfied again.

If the clustering request is approved by other nodes (YES in S16), the radio interface channel is changed by the channel switching unit 4 (FIG. 4) to carry out clustering (S17). Then, the process returns to step S11 to wait until the clustering starting condition is satisfied again.

Channel change may be appropriately performed even after the clustering process according to the channel quality or other factors, as well as in the clustering process.

Figure 8:
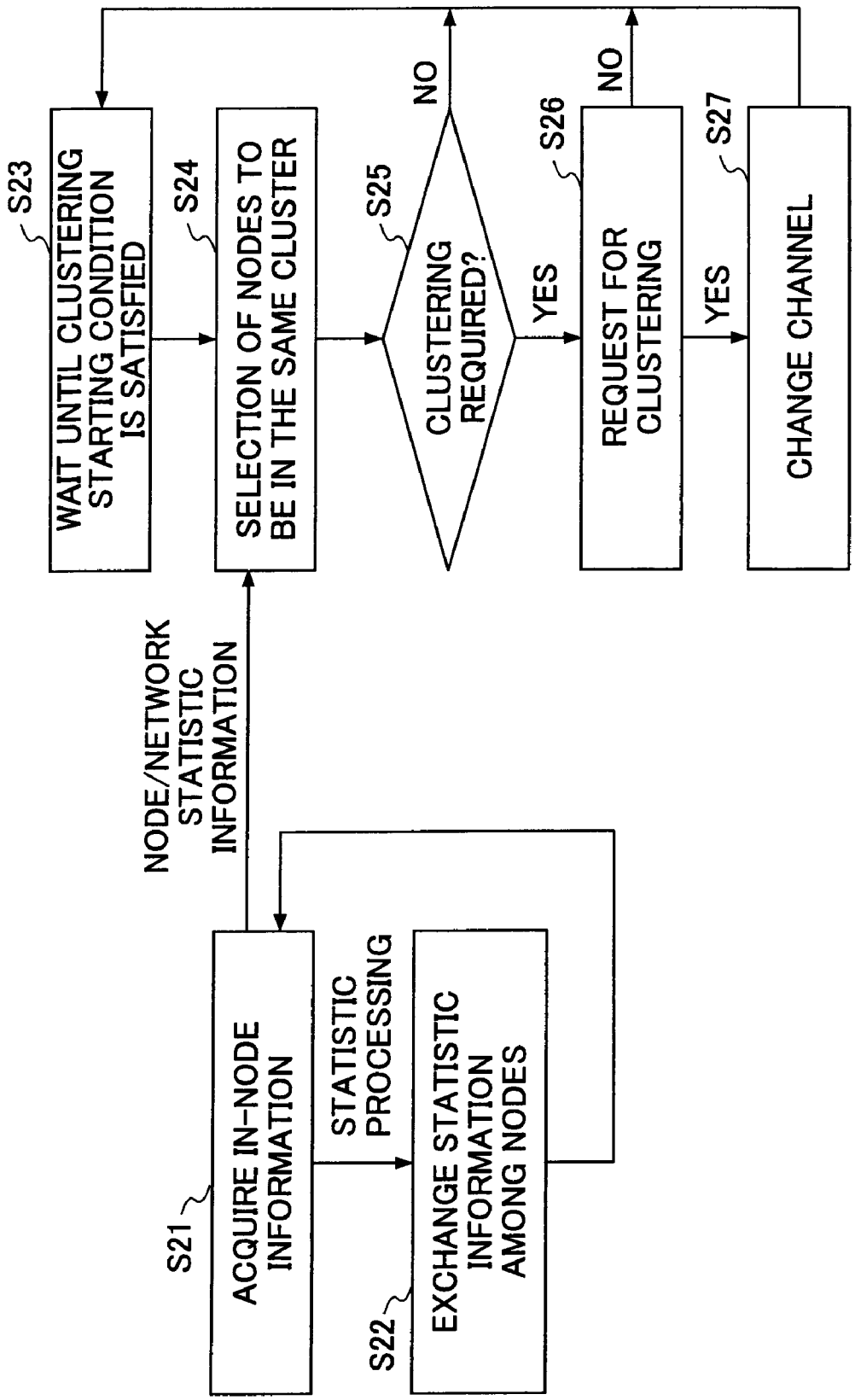
FIG. 8 is a flowchart showing still another example of the clustering operation at the access point.

FIG. 8 is a flowchart of still another example of clustering operation carried out in each node (access point) in the network.

In FIG. 8, the access point acquires statistical information (in-node information) as needed after start-up (S21), and exchanges the statistical information between other nodes every time an event occurs (S22). An example of occurrence of an event is elapse of a prescribed time period when the statistical information is transmitted periodically for information sharing (or exchange), or increase of the rate of change or the absolute value of the acquired in-node information over a threshold if the statistical information is transmitted for information sharing on the condition of traffic change.

In parallel to the above-described steps, the access point waits until the clustering starting condition is satisfied (S23). An example of satisfaction of the clustering starting condition is, (e.g. 1) elapse of a prescribed time period when the clustering operation is performed at constant intervals, (e.g. 2) receipt of an instruction from an upper layer, such as a routing layer, when the clustering operation is performed according to the network topology or the route change. Alternatively, if the clustering operation is started when the traffic amount is changed due to termination or start of communication, the condition is satisfied when the statistical information value or the amount of change exceeds a prescribed threshold at the time of receiving or measuring the statistical information to be exchanged. If two or more nodes start the clustering operation simultaneously, the same channel may be selected by these nodes. Accordingly, in this case, each node starts the clustering operation after a random time has passed since the clustering start condition has been satisfied.

Then, the clustering determination unit 3 (FIG. 4) selects nodes that the access point wants to put together in the same cluster, based on the in-node information and the statistical information acquired from other nodes through information exchange (S24). In this step, the clustering or channel allocation process aims to increase the candidates of the routing paths; scatter traffic load on congested paths in order to increase the throughput; allocate the same channel as that of a heavy traffic node in order to increase the throughput; avoid occurrence of interference or collision and fall of throughput due to a layout in which a particular node serves as a hidden node or an exposed node; and prevent the throughput from falling due to collision or transmission queues by using a channel different from the channel used on a link between heavy traffic nodes.

Then, it is determined whether new clustering is required (S25). If no clustering is required (the current state is maintained without change), the process returns to step S23 to wait until the clustering start condition is satisfied.

If new clustering is required, the change switching unit 4 transmits a clustering request to the selected nodes to be clustered (S26). If an affirmative response is received, the channel switching is carried out (S27). Transmission of clustering request (S26) may be omitted if all the nodes share the same information through exchange of the statistical information. In this case, channel change may be carried out without performing the request sequences between nodes. In the channel change, an appropriate channel can be selected so as not to overlap with nearby clusters to avoid interference of radio waves, and to be consistent with the channel quality. It is provided that the same channel set is used in a cluster; however, all the nodes in the cluster do not necessarily have to use the same channels. For example, under the situation where two radio interfaces are used, a channel set of three or more channels may be used. In this case, an actually allocated two channels are selected from the channel set for each node. The same applies even if the number of radio interfaces varies among the nodes.

After the channel change, the process returns to step S23 to wait until the clustering starting condition is satisfied again.

Channel change may be performed appropriately even after the clustering process according to the channel quality or other factors, as well as in the clustering process. If it is determined through exchange of statistical information that the traffic condition has changed and that execution of clustering may cause the system throughput to fall, then the channel may be restored to the previous state or further channel change may be continuously performed.

Figure 9:
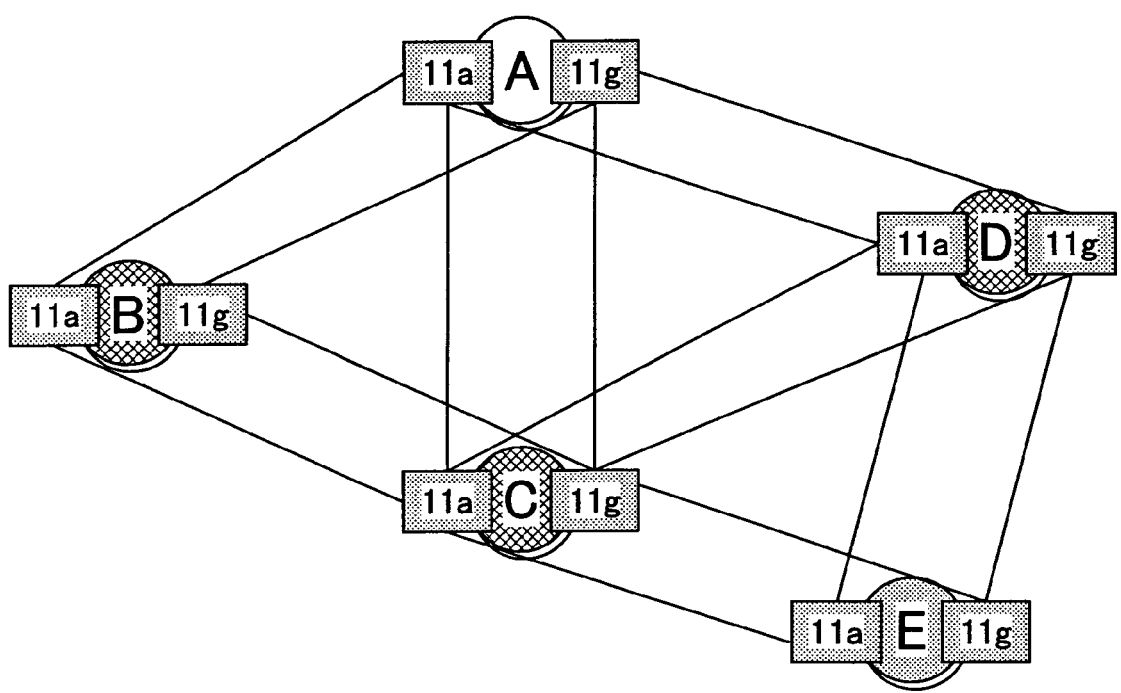
FIG. 9 is an example of access point layout.

FIG. 9 is an example of access point layout. Each of the access points A, B, C, D, and E has two radio interfaces, namely, an IEEE 802.11a radio interface and an IEEE 802.11g radio interface.

Figure 10:
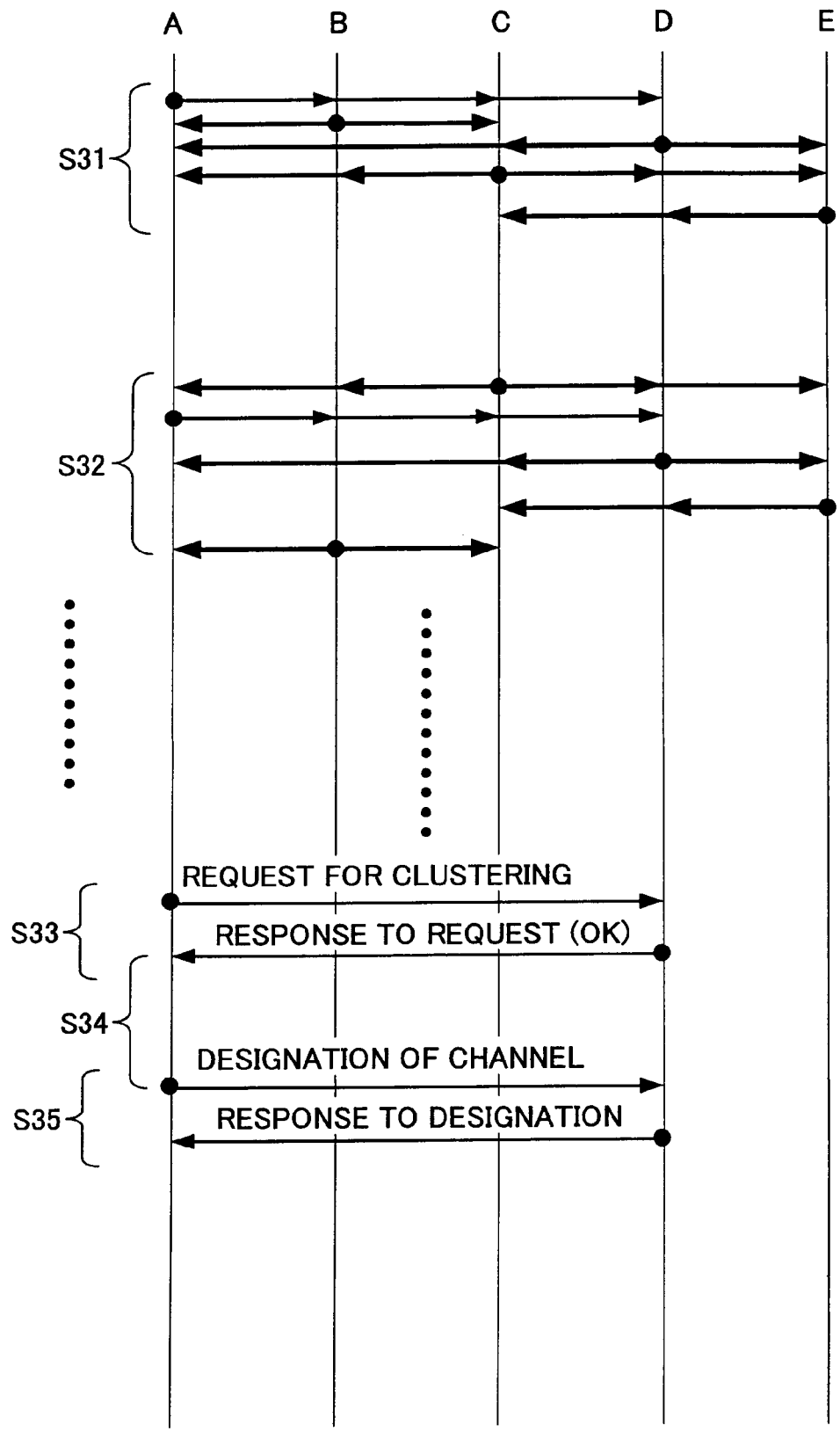
FIG. 10 is a sequence diagram of signal transmission between access points.

FIG. 10 is a sequence diagram showing message transmission between access points arranged in the topology shown in FIG. 9. Statistical information is exchanged among access points A-E, with each access point originates and sends statistical information (S31 and S32). Then, for example, access point A requests access point D for clustering, and receives an affirmative response from access point D (S33). Access point A performs channel scan (S34), designates a channel for communication with access point D (S35), and channel change is carried out.

Figure 11A:
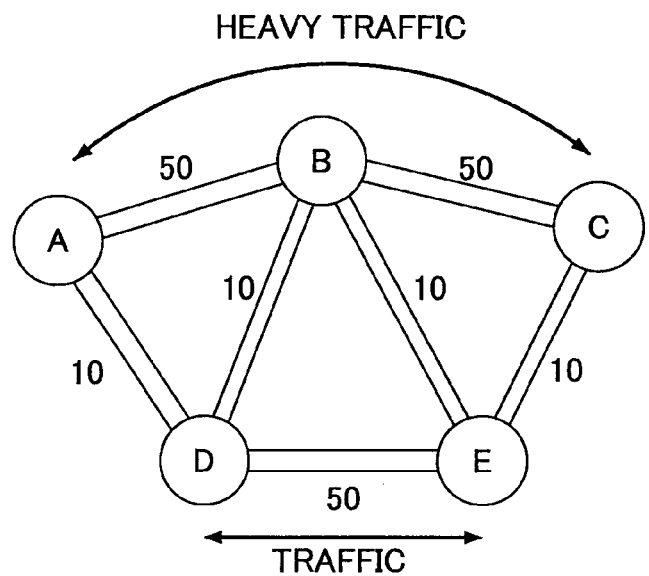
FIG. 11A through FIG. 11C illustrate clustering examples.
Figure 11B:
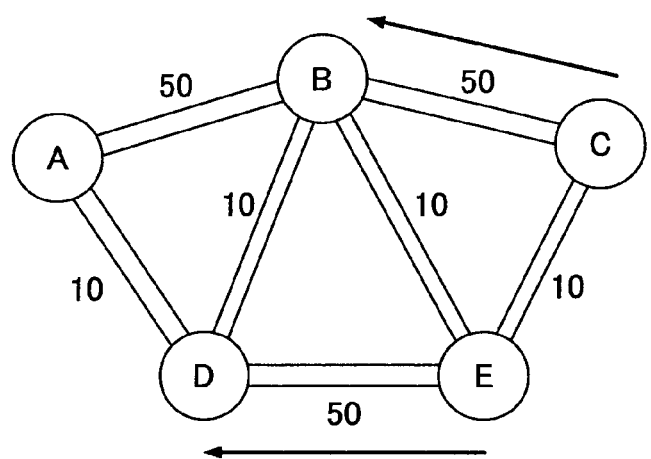
Figure 11C:
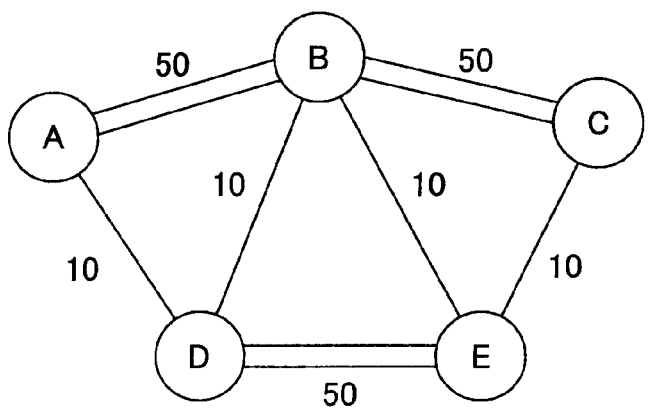

FIG. 11A through FIG. 11C illustrate an example of the clustering determination algorithm for determining whether new clustering is required. In FIG. 11A through FIG. 11C, double-lined links between nodes indicate that transmission can be performed using two radio interfaces, and figures (numerical symbols) put on the links indicate the link traffic (for example, time rate of channel occupation (%)). Because each of the access points A-E knows the traffic at other nodes by sharing traffic information through exchange of statistical information, each node can estimate traffic load on the channel itself, traffic load of the access point (node) itself with respect to the overall network traffic load, or to what extent the throughput will be improved if a particular node changes channels. For example, in FIG. 11A through FIG. 11C, it is understood through exchange of statistical information that a high-load links exist on paths A-B-C and D-E.

Since each of the access points A-E deals with only two radio interfaces simultaneously, the most appropriate way is to cluster A, B, and C, while grouping D and E in a different cluster, to allocate a different channel to each of the two radio interfaces. Accordingly, it is determined by an access point that clustering of the node (access point) itself and clustering of other nodes are required.

FIG. 11A illustrates the state before clustering. It is assumed that, at access point C, the link with traffic "50" exceeds the first threshold T1, and that the link occupation rate (50/70) exceeds the second threshold T2. In this case, access point C requests access point B to change channels in order to bring access point B into the same cluster. Similarly, if the link with traffic "50" exceeds the first threshold T1 and the link occupation rate (50/70) exceeds the second threshold T2 at access point E, then, access point E requests access point D to change channels in order to be in the same cluster with access point D. The arrows shown in FIG. 11B indicate transmission of requests for channel change.

In response to the channel change request, access point B refuses channel change because link A-B is in the high-load state, and access point D accepts channel change. Then, as illustrated in FIG. 11C, access points D and E change the channel such that the links from access points D and E to the other access points A, B, and C are connected by a common channel using a single radio interface, while maintaining the link between access points D and E using two radio interfaces so as to be tolerable against high load.

(Of course, this is an example algorithm so it is possible to change channel A-B-C simultaneously if we set the thresholds properly or use another judging algorithms)

If it is determined that new clustering is required, channel allocation is performed. There are mainly three methods for channel allocation listed below.
(1) Changing a channel without exchanging sequences between nodes if all the nodes share the same information through exchange of statistical information. This method does not require transmission of a message, and it is advantageous in not imposing a load on the channel.
(2) Transmitting a channel change instruction message from a node that requests a channel change to a node (cluster member) that is to cooperate with for channel change. Upon receiving the channel change message, the requested node changes the current channel to a new channel designated in the channel change message. With this method, the channel load may increase, as compared with method (1), due to transmission of the channel change instruction message; however, it is advantageous because the channel can be changed to a better one in a reliable manner based on channel designation.
(3) Confirming intent to cluster through transmission of messages, transmitting a channel change instruction message after confirmation, and then carrying out clustering and channel change. This method may cause the load to increase much more; however, channel change can be performed reliably according to the condition of each node. The example shown in FIG. 11A through 11C employs method (3).

Figure 12A:
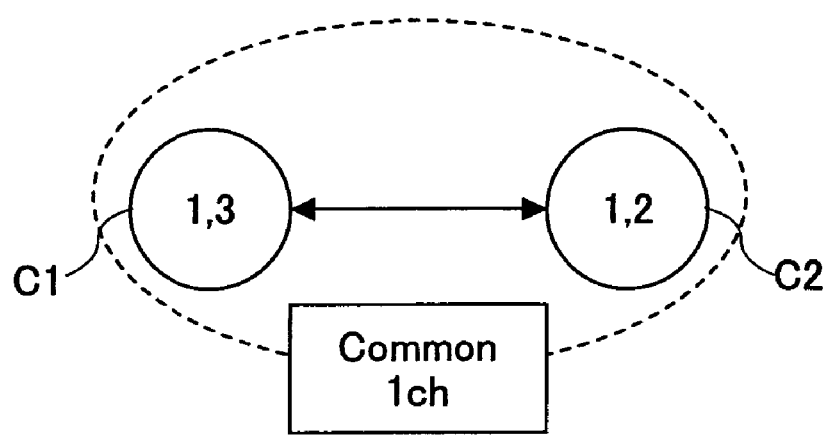
FIG. 12A and FIG. 12B illustrate examples of clustering based on the channel allocation method according to an embodiment of the invention.
Figure 12B:
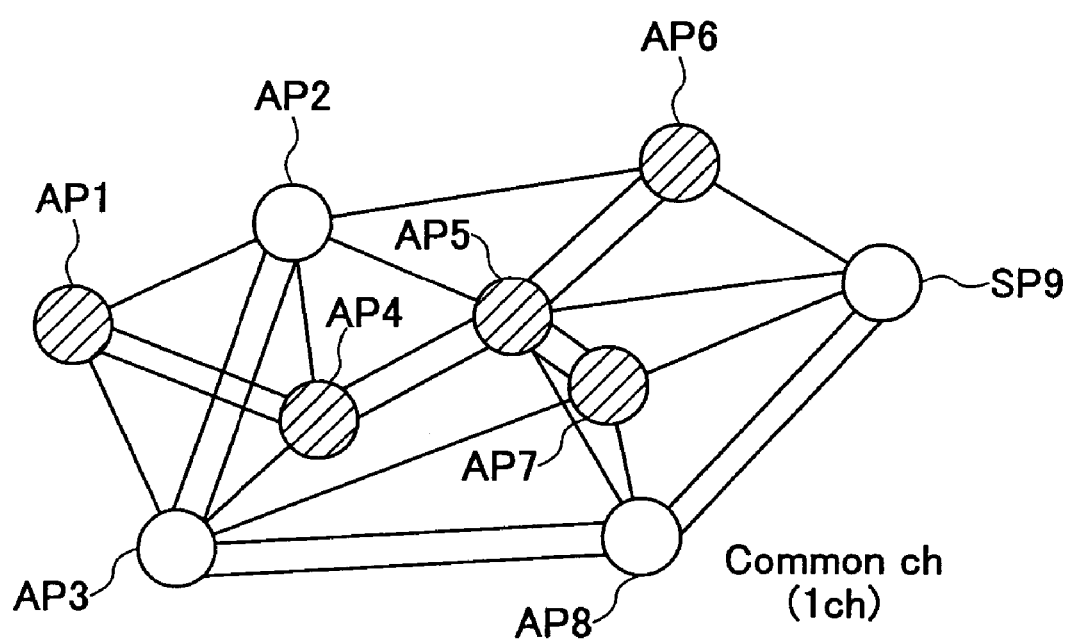

FIG. 12A and FIG. 12B illustrate another example of clustering by the channel allocation method according to an embodiment of the invention, in which a common channel is provided. As illustrated in FIG. 12A, each access point has two radio interfaces, using a common channel "1ch". Cluster C1 uses a channel set of "1ch" and "3ch", and cluster C2 uses a channel set of "1 ch" and "2ch". Either of the channel sets is allocated to each access point. This arrangement can apply to a case in which each access point has two or more radio interfaces.

FIG. 12B illustrates a clustered mesh network, in which dynamic and logical clustering is performed so as to put access points with high traffic in the same cluster, regardless of the physical locations (topology) of the access points. In this example, access points AP1, AP4, AP5, AP6, and AP7 are assembled in the same cluster, and access points AP2, AP3, AP8, and AP9 are put in another cluster. Access points located away from each other may not communicate directly with each other because the radio wave does not reach throughout the same cluster.

In this case, because there are two channels available for each access point in the same cluster, high-rate transmission can be performed, and an environment adaptive to the current transmission conditions with heavy traffic can be constituted. Inter-cluster communication (communication across clusters) can also be performed sufficiently using the common channel in accordance with the current transmission conditions, although it may not be as efficient as the intra-cluster communication.

Figure 13A:
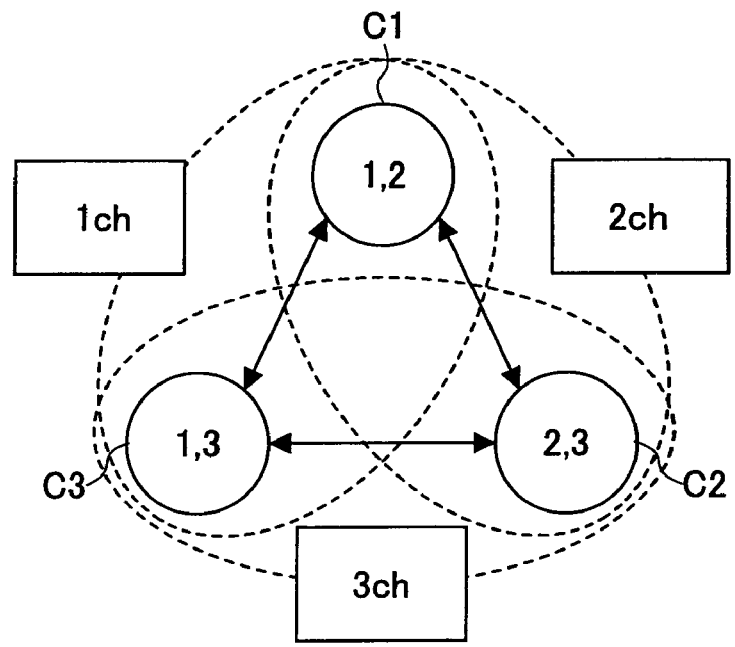
FIG. 13A and FIG. 13B illustrate other examples of clustering based on the channel allocation method according to an embodiment of the invention.
Figure 13B:
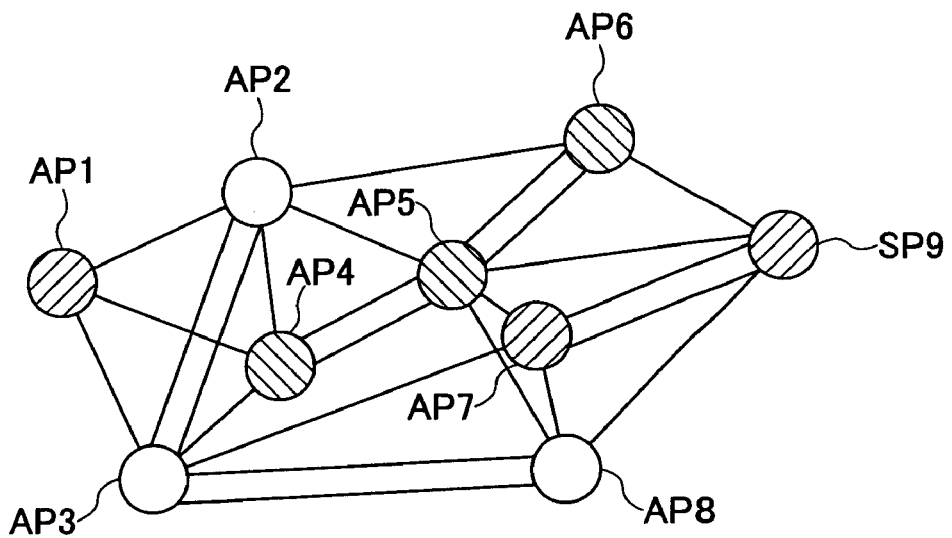

FIG. 13A and FIG. 13B illustrate still another example of clustering based on channel allocation according to an embodiment of the invention, in which a common channel throughout the network is not provided. As illustrated in FIG. 13A, each access point has two radio interfaces. Cluster C1 uses a channel set of "1ch" and "2ch", cluster C2 uses a channel set of "2ch" and "3ch", and cluster C3 uses a channel set of "1ch" and "3ch". Between clusters C1 and C2 is used "2ch" as the common channel. Channel "3ch" is shared between clusters C2 and C3, and channel "1 ch" is used commonly between clusters C3 and C1. This arrangement can apply to a case in which each access point has two or more radio interfaces.

FIG. 13B illustrates a clustered mesh network, in which access points AP1, AP7 and AP9 are assembled in the same cluster, access points AP2, AP3 and AP8 are in another cluster, and access points AP4, AP5 and AP6 are put in still another cluster. Access points located away from each other may not communicate with each other because the radio wave does not reach throughout the same cluster.

In this case, because there are two channels available for each access point in the same cluster, high-rate transmission can be performed, and an environment adaptive to the current transmission conditions with heavy traffic can be constituted. Inter-cluster communication (communication across clusters) can also be performed sufficiently using a common channel between particular clusters (even without a common channel shared throughout the network) in accordance with the current transmission condition, although it may not be as efficient as the intra-cluster communication. The arrangement shown in FIG. 13 can achieve inter-cluster communication at higher rates, as compared with that shown in FIG. 12, because radio wave interference is less likely to occur.

In general, delay time is produced during the control operation for performing channel change. In addition, when the routing module 5 (FIG. 4) of each node switches the route, communication may be cut off temporarily, which may cause packet loss. For this reason, each node is configured to supply a channel indication message containing information about the radio interface to be changed to the routing module 5 in order to perform the channel change. Upon receiving the signal, the routing protocol of the routing module 5 uses another route to carry out communication until the channel change is completed. In other words, packet loss can be prevented by suspending transmission of routing signals using the radio interface being changed.

Figure 14A:
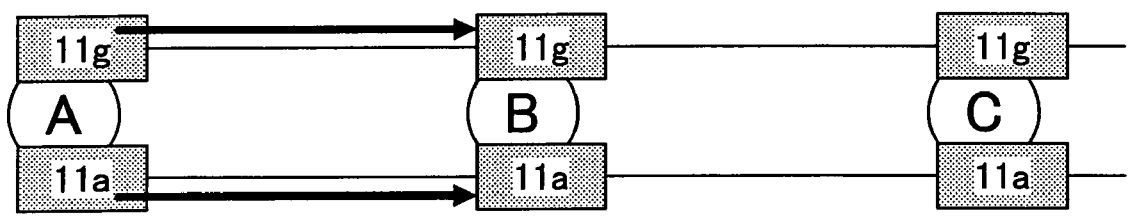
FIG. 14A and FIG. 14B illustrate examples of control operations carried out by the routing module when a channel is changed.
Figure 14B:
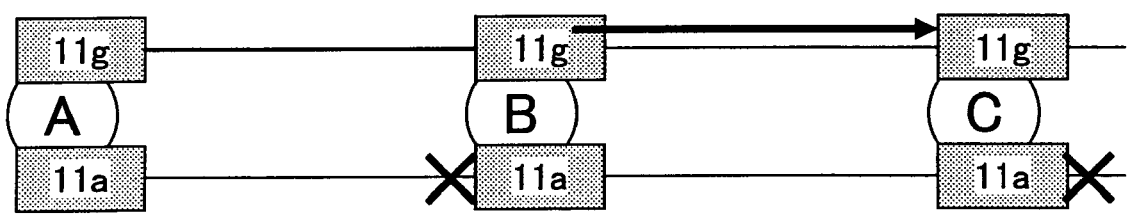

FIG. 14A and FIG. 14B are schematic diagrams illustrating the control operation of the routing module 5 performed when changing the channel. As illustrated in FIG. 14A, a route request is transmitted from access point A to access point B using both radio interfaces 11g and 11a. When the channel of the radio interface 11a is changed, each of the access points B and C supplies a channel indication message containing the information about the radio interface of that node to be changed to the routing module. Upon receiving the signal, the routing module suspends transmission of routing signal at radio interface 11a (which is to be changed) for a time period longer than the route updating interval. Accordingly, as illustrated in FIG. 14B, route request through radio interface 11a is shut off for a while so as not to use radio interface 11a before channel change. After the channel change, signal transmission for routing using radio interface 11a is started again, thereby preventing packet loss during the channel change.

With this arrangement, routing is performed so as to be consistent with the channel change operation, without changing the routing protocol itself or the state transition or the operations flow.

An application of the present invention includes a home mesh network including a television set, a DVD player, and other consumer electronics, which appliances function as access points. When a large volume of data transmission occurs from the television set to the DVD player, smooth data transmission may not be performed due to an insufficient number of channels between the television set and the DVD player under the channel allocation based on the conventional topology. In addition, use of other access points (such as a personal computer) in the mesh network may be adversely affected under the conventional topology. In contrast, with channel allocation according to the embodiment of the invention, the television set and the DVD player between which a large amount of data transmission is to be carried out are included in the same cluster, and multiple channels are preferentially and dynamically allocated to these appliances. Consequently, smooth data transmission between the television set and the DVD player can be achieved, without adversely affecting use of other access points.

The present invention has been described based on specific embodiments, using an application of the IEEE 802.11 wireless LAN. However, the present invention is not limited to this example, and there are many modifications and substitutions that can be made without departing from the scope of the invention defined by the appended claims. For example, the present invention is applicable to the IEEE 802.15 standard, the IEEE 802.16 standard, the IEEE 802.20 standard, and communication between base stations in cellular communication systems.

What is claimed is:

1. An access point comprising:
   an in-node information acquiring unit configured to acquire information about the access point itself;
   a statistical information exchanging unit configured to exchange statistical information with other nodes;
   a clustering determination unit configured to select a node to be clustered based on the in-node information and the exchanged statistical information, at least one of the in-node information and the exchanged statistical information includes a time rate of channel occupation estimated from a modulation scheme and calculated based on a number of packets transmitted and received and a packet size; and
   a channel switching unit configured to change a radio interface channel based on the determination result made by the clustering determination unit.

2. The access point of claim 1, further comprising:
   a control line for supplying a channel change message to a routing protocol;
   wherein the routing protocol temporarily uses a radio interface different from a target radio interface to be subjected to channel change for current communication, based on the channel change message.

3. The access point of claim 1, further comprising:
   a control line for supplying a channel change message to a routing protocol;
   wherein the routing protocol temporarily suspends transmission of a routing signal at a target radio interface to be subjected to channel change for a prescribed time period, based on the channel change message.

* * * * *